(12) United States Patent
Saito et al.

(10) Patent No.: US 8,587,281 B2
(45) Date of Patent: Nov. 19, 2013

(54) OPERATION CONTROLLER, DC-DC CONVERTER CONTROLLER, AND DC-DC CONVERTER

(75) Inventors: Hiroshi Saito, Tokyo (JP); Yuichi Goto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/571,324

(22) Filed: Aug. 9, 2012

(65) Prior Publication Data

US 2013/0229160 A1  Sep. 5, 2013

(30) Foreign Application Priority Data

Mar. 5, 2012 (JP) ................................. 2012-048125

(51) Int. Cl.
*H02M 1/36* (2007.01)
*G05F 1/618* (2006.01)

(52) U.S. Cl.
USPC .............................. 323/282; 323/901; 363/49

(58) Field of Classification Search
USPC ....................... 323/282, 284, 285, 901; 363/49
See application file for complete search history.

(56) References Cited

U.S. PATENT DOCUMENTS

| | | | |
|---|---|---|---|
| 4,736,116 A * | 4/1988 | Pavlak et al. | 307/41 |
| 7,839,130 B2 * | 11/2010 | Shimizu | 323/282 |
| 7,868,602 B2 * | 1/2011 | Omi et al. | 323/284 |
| 2002/0121882 A1 | 9/2002 | Matsuo et al. | |

FOREIGN PATENT DOCUMENTS

| | | |
|---|---|---|
| JP | 2000181554 A | 6/2000 |
| JP | 2002320380 A | 10/2002 |
| JP | 2009011055 A | 1/2009 |
| JP | 2009110550 A | 5/2009 |

* cited by examiner

*Primary Examiner* — Gary L Laxton
(74) *Attorney, Agent, or Firm* — Patterson & Sheridan, LLP

(57) ABSTRACT

An operation controller has a reference voltage generator, a starter circuit, and a switch element. The reference voltage generator is connected to an enable terminal to which an enable signal is supplied. After the enable signal is supplied and a start signal is generated, the reference voltage generator generates a reference voltage up to a stable value. After the reference voltage rises to the stable value, it generates a stop signal. When the enable signal is supplied, the starter circuit generates the start signal, and supplies it to the reference voltage generator. When the enable signal is no longer supplied or the stop signal is generated, the start signal is terminated. The switch element has one end connected to the enable terminal and the other end supplied with a prescribed voltage; it turns on when the start signal is generated, and turns off when the start signal is terminated.

20 Claims, 5 Drawing Sheets

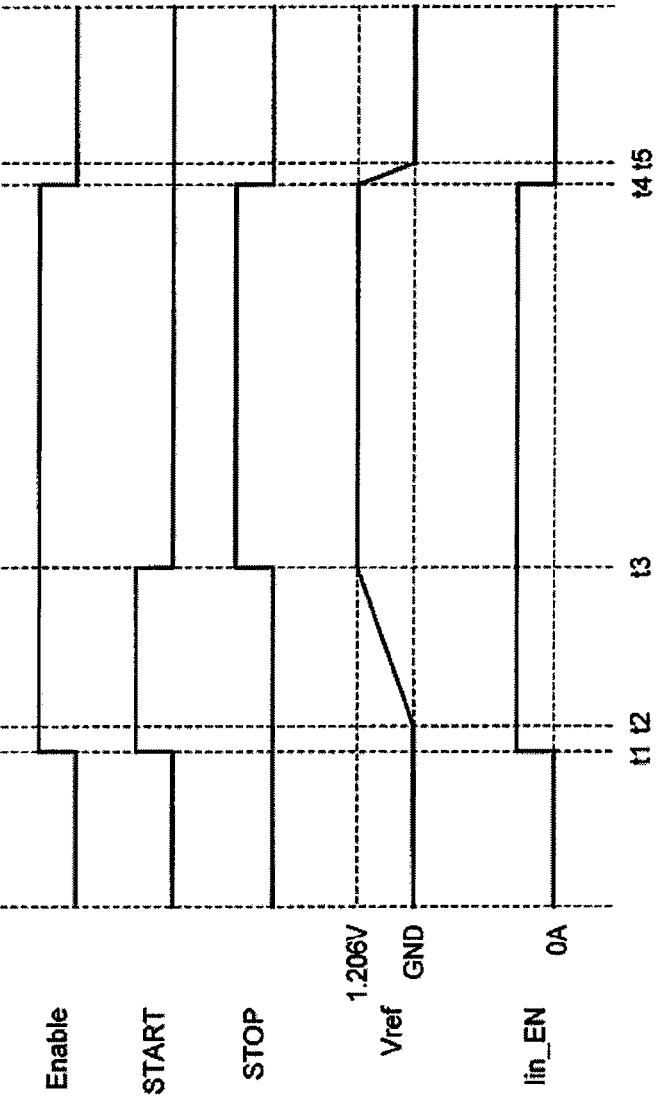

US 8,587,281 B2

OPERATION CONTROLLER, DC-DC CONVERTER CONTROLLER, AND DC-DC CONVERTER

CROSS-REFERENCE TO RELATED APPLICATION

This application is based upon and claims the benefit of priority from Japanese Patent Application No. 2012-048125, filed Mar. 5, 2012; the entire contents of which are incorporated herein by reference.

FIELD

Embodiments described herein relate generally to an operation controller, a DC-DC converter controller, and a DC-DC converter.

BACKGROUND

There is a demand for increasing the efficiency of the DC-DC converter with a low load. To increase efficiency, it may be beneficial to decrease the current consumption of the DC-DC converter during operations with a low load attached. In addition to reducing the current in the various circuits that form the DC-DC converter, the current flowing in through the enable terminal for controlling start/stop of the operation may also be reduced to contribute to efficiency gains. In some configurations, the enable terminal is connected to ground with a pull-down resistor to avoid mis-operation when the terminal is open. In order to reduce the current flowing in through the enable terminal, the resistance value of the pull-down resistor may be increased.

However, when the resistance value of the pull-down resistor is increased, the overall chip size becomes larger.

DESCRIPTION OF THE DRAWINGS

FIGS. 5A to 5E are time charts illustrating the operation of the DC-DC converter of FIG. 4 in the normal connection state.

DETAILED DESCRIPTION

In general, one embodiment will be explained with reference to figures.

According to an embodiment, the operation controller has a reference voltage generator, a starter circuit, and a switch element. The reference voltage generator is connected to an enable terminal configured to have an enable signal supplied to it. When the reference voltage generator is started after feeding of the enable signal, it generates a reference voltage up to a stable value. Once the reference voltage rises to the stable value, the reference voltage generator generates a stop signal.

The starter circuit operates as follows: upon the enable signal being supplied to the enable terminal, a start signal is generated and sent to the reference voltage generator. Subsequently, when the enable signal is terminated or a stop signal is generated by the reference voltage generator, the start signal is terminated.

The switch element has one end connected to the enable terminal and is configured for connection to a prescribed voltage at the other end. The switch element is turned on during the period in which the start signal is generated and is turned off when the start signal is terminated.

This disclosure describes aspects of an operation controller, a DC-DC converter controller, and a DC-DC converter that can protects against mis-operation. Furthermore, the embodiments facilitate a decrease in the size of the DC-DC converter, as well as a reduction in the current drawn by the DC-DC converter at the enable terminal.

Figure 1:
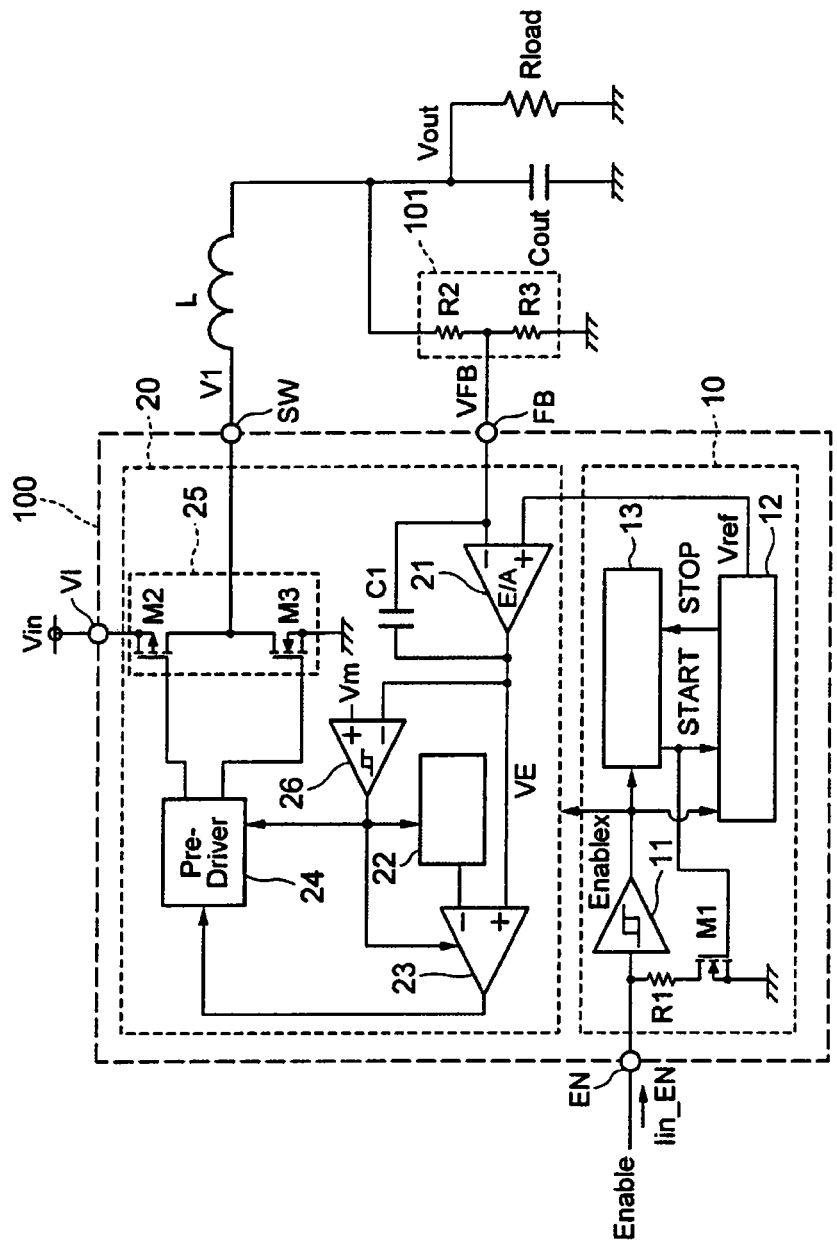
FIG. 1 is a block diagram illustrating a DC-DC converter according to an embodiment.

FIG. 1 is a block diagram illustrating the DC-DC converter related to an embodiment. As shown in FIG. 1, the DC-DC converter has a DC-DC converter controller 100, an inductor L, an output capacitance Cout, and a voltage divider 101.

As to be explained later, the DC-DC converter controller 100 turns off operations (goes into a shut down state) when the enable signal Enable is not fed, and it uses an input voltage Vin to output a pulse signal V1 when the enable signal Enable is fed (goes into an active state). In one embodiment, the DC-DC converter controller 100 is formed as an integrated circuit.

For the inductor L, the pulse signal V1 is fed to a first end from the output terminal SW, and the other end of the inductor L outputs an output voltage Vout. An output capacitor Cout has one end connected to the other end of the inductor L, and has ground voltage fed to the other end thereof.

The voltage divider 101 divides the output voltage Vout, and outputs a feedback voltage VFB to a feedback terminal FB. The voltage divider 101 has a first voltage dividing resistor R2 and a second voltage dividing resistor R3. The first voltage dividing resistor R2 has one end connected to the other end of the inductor L, and outputs the feedback voltage VFB from the other end. The second voltage dividing resistor R3 has one end connected to the other end of the first voltage dividing resistor R2, and has the ground voltage fed to the other end thereof.

The output voltage Vout is fed to a load resistor Rload. The load resistor Rload is the equivalent resistance component of the load. For example, the load may be a CPU (central processing unit) or the like.

The DC-DC converter controller 100 has an enable terminal EN, a power supply terminal VI, an output terminal SW, a feedback terminal FB, an operation controller 10, and a pulse controller 20.

The enable terminal EN has the enable signal Enable fed to it from an external circuit (not shown in the figure). For example, the external circuit may be a microcomputer. In this manner, the external circuit can control whether to have the DC-DC converter either in the off state or in the active state, depending on whether the enable signal Enable is fed.

The operation controller 10 controls the operation of the pulse controller 20 in accordance with the enable signal Enable. The operation controller 10 has a Schmidt trigger circuit 11, a reference voltage generator 12, a starter circuit 13, an N-type MOS transistor (switch element) M1, and a resistor R1.

The Schmidt trigger circuit 11 is connected between an enable terminal EN and the reference voltage generator 12 and the starter circuit 13 on an output side. The Schmidt trigger circuit 11 works in accordance with the voltage of the enable terminal EN. When the enable signal Enable is not fed and the voltage at the enable terminal EN is at a low level, an internal enable signal Enablex is turned off; when the enable signal Enable is fed and the voltage at the enable terminal EN is at a high level, the internal enable signal Enablex is generated. The Schmidt trigger circuit 11 has a hysteresis in its input/output characteristics and operates with two different thresholds. The first threshold is used when it is determined that a transition has taken place from no feeding of the enable signal Enable to the feeding state and the second threshold is used when it is determined that a transition has taken place from the feeding state of the enable signal Enable to the no-feeding state.

For the reference voltage generator 12, a connection is made to the enable terminal EN via the Schmidt trigger circuit 11. The reference voltage generator 12 works as follows: after the generation of the internal enable signal Enablex (i.e., after feeding of the enable signal Enable), the reference voltage generator 12 is started and the reference voltage Vref subsequently rises to a stable value; after the reference voltage Vref has risen to be higher than or equal to a preset value, the stop signal STOP is generated. The preset value is set to be lower than or equal to a target value of the reference voltage Vref. The reference voltage generator 12 turns off the operation when the enable signal Enable is not fed. In one embodiment, the reference voltage generator 12 may be made of a band gap reference circuit.

The reference voltage generator 12 has a first operation point and a second operation point; it is in the stable state at either point during the period in which the enable signal Enable is fed. The first operation point is an operation point when no current flows and the reference voltage Vref cannot be generated. The second operation point is an operation point when a current flows and the reference voltage Vref can be generated. In some cases, the reference voltage generator 12 stays at the first operation point and cannot generate the reference voltage Vref. In such a case, the starter circuit 13 is adopted.

The starter circuit 13 is connected to the enable terminal EN via the Schmidt trigger circuit 11. For the starter circuit 13, when the internal enable signal Enablex is generated (i.e., when the enable signal Enable is fed), it generates a start signal START that augments the rise in the reference voltage Vref and is fed to the reference voltage generator 12. When the enable signal Enable is terminated or when the stop signal STOP is generated, the start signal START is terminated.

Because the start signal START is generated, the reference voltage generator 12 can avoid becoming stagnated at the first operation point. Instead, the reference voltage Vref rises to a value that is higher than or equal to the preset value. Subsequently, the start signal START is terminated, and the reference voltage generator 12 operates at the second operation point without being influenced by the start signal START. In this way, the start signal START can serve as a signal for making the transition of the operation point of the reference voltage generator 12 to the second operation point.

For the N-type MOS transistor M1, the drain (one end) is connected to the enable terminal EN, the source (the other end) has the ground voltage fed to it, and the gate has the start signal START fed to it. The N-type MOS transistor M1 is on during the period in which the start signal START is generated, and it is off during the period in which the start signal START is terminated.

The resistor R1 is connected between the enable terminal EN and the drain of the N-type MOS transistor M1. The resistance value of the resistor R1 is selected to ensure that the enable signal Enable has to be fed from the external circuit during the period in which the N-type MOS transistor M1 is on.

To provide an example, it is supposed that the output impedance of the external circuit is 30 kΩ, the power supply voltage of the external circuit is the input voltage Vin, and the resistance value of the resistor R1 is 300 kΩ. When the enable signal Enable is fed from the external circuit under these conditions, during the period in which the N-type MOS transistor M1 is on, the voltage of the enable terminal EN is kept at about 90% of the input voltage Vin. When the second threshold of the Schmidt trigger circuit 11 is set to be sufficiently lower than the 90% of the input voltage Vin, the Schmidt trigger circuit 11 keeps generating the internal enable signal Enablex. Consequently, the enable signal Enable is no longer fed. That is, in such situations, the resistance value of the resistor R1 may be set to be about 10 times the output impedance of the external circuit. However, as to be explained later, it is preferred that the resistance value of the resistor R1 not be too high so that when the enable terminal EN is open (i.e., the enable signal is terminated), the voltage at the enable terminal EN decreases before the output voltage Vout from the DC-DC converter decreases.

For the pulse controller 20, the internal enable signal Enablex is fed from the Schmidt trigger circuit 11. The pulse controller 20 works during the period in which the internal enable signal Enablex is generated, that is, during the period in which the enable signal Enable is fed. The pulse signal V1 is output to the output terminal SW. As explained above, the pulse signal V1 is smoothed to the output voltage Vout by the smoothing circuit that includes the external inductor L and the output capacitor Cout. Also, the pulse controller 20 carries out PWM control for the pulse signal V1 so that the feedback voltage VFB, which is proportional to the output voltage Vout, approaches the reference voltage Vref. As a result, the input voltage Vin is converted to the output voltage Vout, and the output voltage Vout approaches a constant value.

The pulse controller 20 has an error amplifier 21, a capacitor C1, a triangular wave oscillator 22, a PWM comparator 23, a pre-driver 24, a switch part 25, and a mode switching comparator 26.

The error amplifier 21 has the feedback voltage VFB from the feedback terminal FB fed to its inverted input terminal and the reference voltage Vref fed to the non-inverted input terminal, amplifies the difference between the feedback voltage VFB and the reference voltage Vref, and then outputs an error signal VE through its output terminal.

The capacitor C1 is connected between the inverted input terminal and the output terminal of the error amplifier 21 to perform phase compensation.

The triangular wave oscillator 22 generates a triangular wave signal at a preset frequency.

The PWM comparator 23 has the error signal VE fed to the non-inverted input terminal and the triangular wave signal fed to the inverted input terminal, compares the error signal VE and the triangular wave signal, and outputs the comparison result as the PWM signal.

The pre-driver 24 outputs a driving signal for driving the switch part 25 corresponding to the PWM signal.

The switch part 25 switches in accordance with the driving signal, and it outputs the pulse signal V1 to the terminal SW. The switch part 25 has a high-side transistor M2 and a low-side transistor M3. The high-side transistor M2 is made of a P-type MOS transistor and the low-side transistor M3 is made of an N-type MOS transistor.

The high-side transistor M2 has the input voltage Vin fed via the power supply terminal VI to one end (source), outputs the pulse signal V1 through the other end (drain) to the terminal SW, and is fed with the driving signal at its control terminal (gate).

The low-side transistor M3 has its drain end connected to the drain end of the high-side transistor M2, has the ground voltage fed to its source end, and is fed with the driving signal at its control terminal (gate).

The mode switching comparator 26 is a hysteresis comparator having hysteresis in its input/output characteristics. The preset mode switching voltage Vm is fed to the non-inverted input terminal, and the error signal VE is fed to the inverted input terminal. The mode switching comparator 26 works as follows: when the error signal VE changes from higher than or equal to a low voltage threshold (e.g., mode switching voltage Vm−preset voltage ΔV) to lower than the low voltage threshold, it is determined that the DC-DC converter 100 is in the low load state with a small load current consumption, and the operation of the triangular wave oscillator 22, the PWM comparator 23, and the pre-driver 24 is turned off. As a result, the current consumption of the triangular wave oscillator 22, the PWM comparator 23 and the pre-driver 24 becomes nearly zero. Also, the pulse signal V1 is not output. As a result, it is possible to decrease the mean current consumption of the DC-DC converter 100. The control is carried out, since the error signal VE is related to the current flowing in the inductor L.

For the mode switching comparator 26, when the load is low, the operation is turned off for at least some of the triangular wave oscillator 22, the PWM comparator 23 and the pre-driver 24.

For the mode switching comparator 26, when the error signal VE changes from lower than a high voltage threshold (e.g., mode switching voltage Vm+preset voltage ΔV) to higher than or equal to the high voltage threshold, the triangular wave oscillator 22, the PWM comparator 23 and the pre-driver 24 are turned on. As a result, when the output voltage Vout decreases in the low load state, the pulse of the pulse signal V1 is output again and the output voltage Vout can rise. That is, in the low load state, intermittent operation takes place for the triangular wave oscillator 22, the PWM comparator 23 and the pre-driver 24, and the pulses of pulse signal V1 are intermittently output.

Under such control, in the normal operation state with a high load, the triangular wave oscillator 22, PWM comparator 23 and pre-driver 24 continuously operate, and the pulses of pulse signal V1 are continuously output.

In the following paragraphs, the operation of the DC-DC converter will be explained with reference to FIGS. 2A to 2F and 3A to 3F.

(In Normal Connection State)

First of all, an explanation will be made in the case of normal connection with the enable terminal EN electrically connected to the external circuit. That is, the voltage of the enable terminal EN is controlled by the external circuit.

FIGS. 2A to 2F are time charts illustrating the operation in the case of normal connection of the DC-DC converter according to an embodiment. Before time point t1, the enable signal Enable is not fed from the external circuit, and it attains a low level. Consequently, the DC-DC converter controller 100 does not work, and the DC-DC converter does not output the output voltage Vout.

Figure 2:
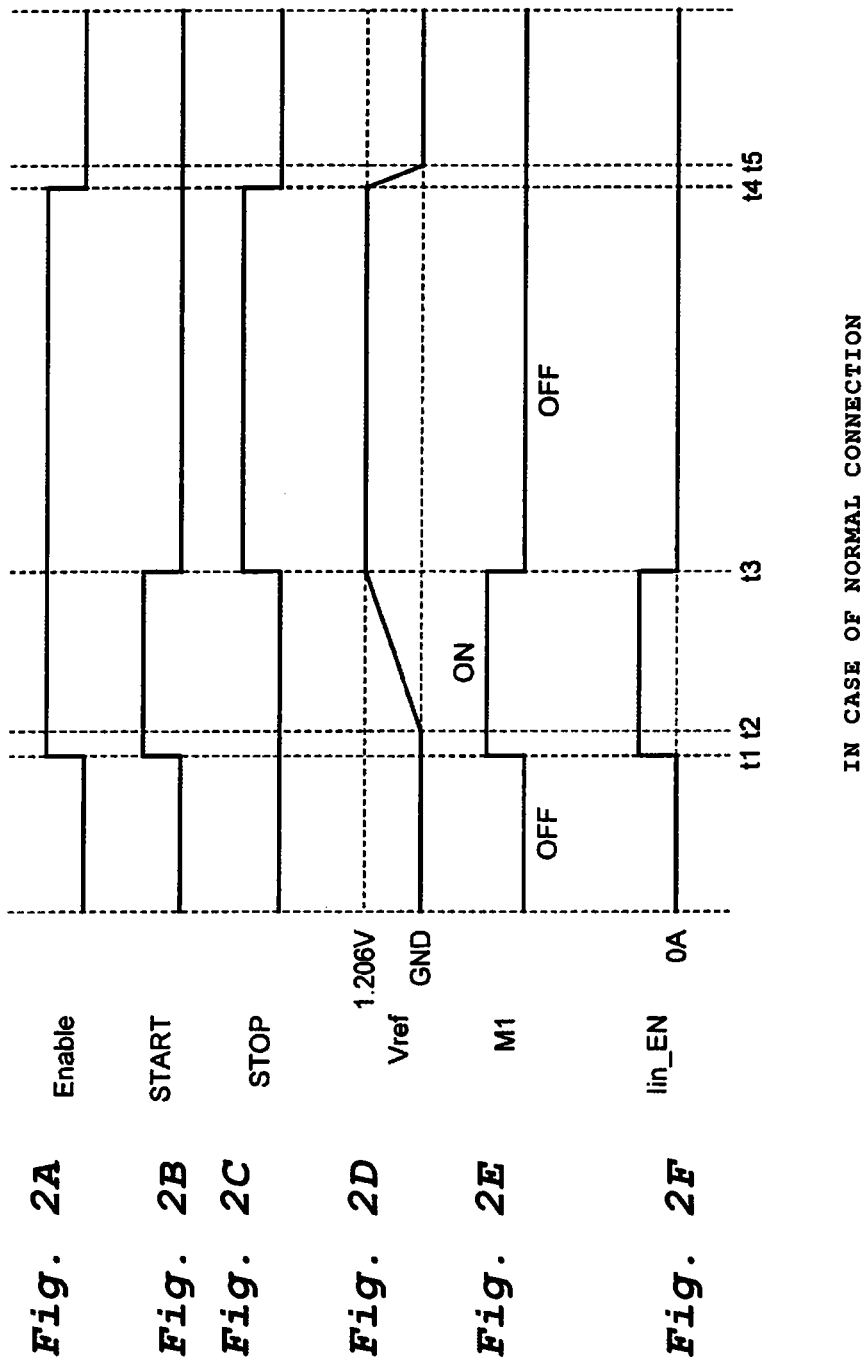
FIGS. 2A to 2F are time charts illustrating the operation of the DC-DC converter according to the embodiment in the normal connection state.

At time point t1, the enable signal Enable is fed from the external circuit, and it attains a high level (FIG. 2A). As a result, the starter circuit 13 generates the start signal START (on the high level) (FIG. 2B). Consequently, the N-type MOS transistor M1 is turned on (FIG. 2E) and the current Iin_EN flows in from the enable terminal EN; it flows to the resistor R1 and the N-type MOS transistor M1 (FIG. 2F).

Also, for the reference voltage generator 12, when the enable signal Enable is fed, the start signal START is generated, so that it is started and, after time point t2 delayed from time point t1, the reference voltage Vref rises from the ground voltage GND (0 V) (FIG. 2D).

At time point t3, for the reference voltage generator 12, as the reference voltage Vref rises to higher than or equal to the preset value, the stop signal STOP is generated (the stop signal STOP goes to a high level) (FIG. 2C). As a result, the starter circuit 13 turns off the start signal START (the start signal START goes to a low level). Consequently, the N-type MOS transistor M1 is turned off and the current Iin_EN does not flow in from the enable terminal EN. After time point t3, for example, the reference voltage Vref becomes stable at the value of about 1,206 V.

In addition, as explained above, in the period from time point t1 to t3, because the N-type MOS transistor M1 is on, the enable signal Enable decreases a little. However, this is not shown in the figure.

At time point t4, when the enable signal Enable is not fed from the external circuit (i.e., terminated), the reference voltage generator 12 stops generation of the reference voltage Vref and, at the same time, it turns off the stop signal STOP (the stop signal STOP goes to the low level). Then, at time point t5, the reference voltage Vref decreases to the ground voltage GND (0 V).

In this way, in the period from time point t1 to t4, when the enable signal Enable is fed, only during the period from time point t1 to t3, when the start signal START is generated, does the current Iin_EN flow in from the enable terminal EN. That is, the period in which the current Iin_EN flows in from the enable terminal EN can be significantly shortened with no regard to the period in which the enable signal Enable is fed. Consequently, according to the present embodiment, without increasing the area of the resistor R1 and the N-type MOS transistor M1, it is possible to reduce the current Iin_EN flowing in from the enable terminal EN.

Also, in the period from time point t3 to t4, the reference voltage Vref is stable at the stable value of about 1.206 V, so that the DC-DC converter works normally, and it outputs the output voltage Vout. As explained above, for the DC-DC converter controller 100, in the case of a low load, for example, during the period of about 1% of the operation period, PWM operation is carried out to output the output voltage Vout so that the current consumption becomes about 500 μA. During the remaining approximately 99% period, the operation of the triangular wave oscillator 22, etc., is turned off, and the current consumption decreases to about 20 μA. Consequently, in this case, the mean current consumption excluding the current Iin_EN from the enable terminal EN is decreased to about 25 μA.

According to this embodiment, it is possible to reduce the current Iin_EN flowing in from the enable terminal EN during the low load state. Consequently, it is possible to ensure that there is little increase in the mean current consumption of the DC-DC converter in the low load state. As a result, it is possible to increase the efficiency in the low load state of the DC-DC converter.

(When the Enable Terminal EN is Open)

In the following, the case in which the enable terminal EN is not electrically connected to the external circuit and the enable terminal EN is open will be explained. More specifically, in this state, the terminals other than the enable terminal EN of the DC-DC converter controller 100 are normally connected, and the DC-DC converter can operate according to the voltage of the enable terminal EN. In this case, although the enable signal Enable is not fed from the external circuit, the voltage at the enable terminal EN in the open state can still be increased under the influence of high frequency noise, etc. As the voltage at the enable terminal EN rises, the DC-DC converter operates, so that the output voltage Vout is fed to the load (such as a CPU). For example, such a state may take place when the product using the DC-DC converter is in the stage of testing. As the output voltage Vout is fed to the load at a time when there should be no voltage supplied, the load may be damaged.

Figure 3:
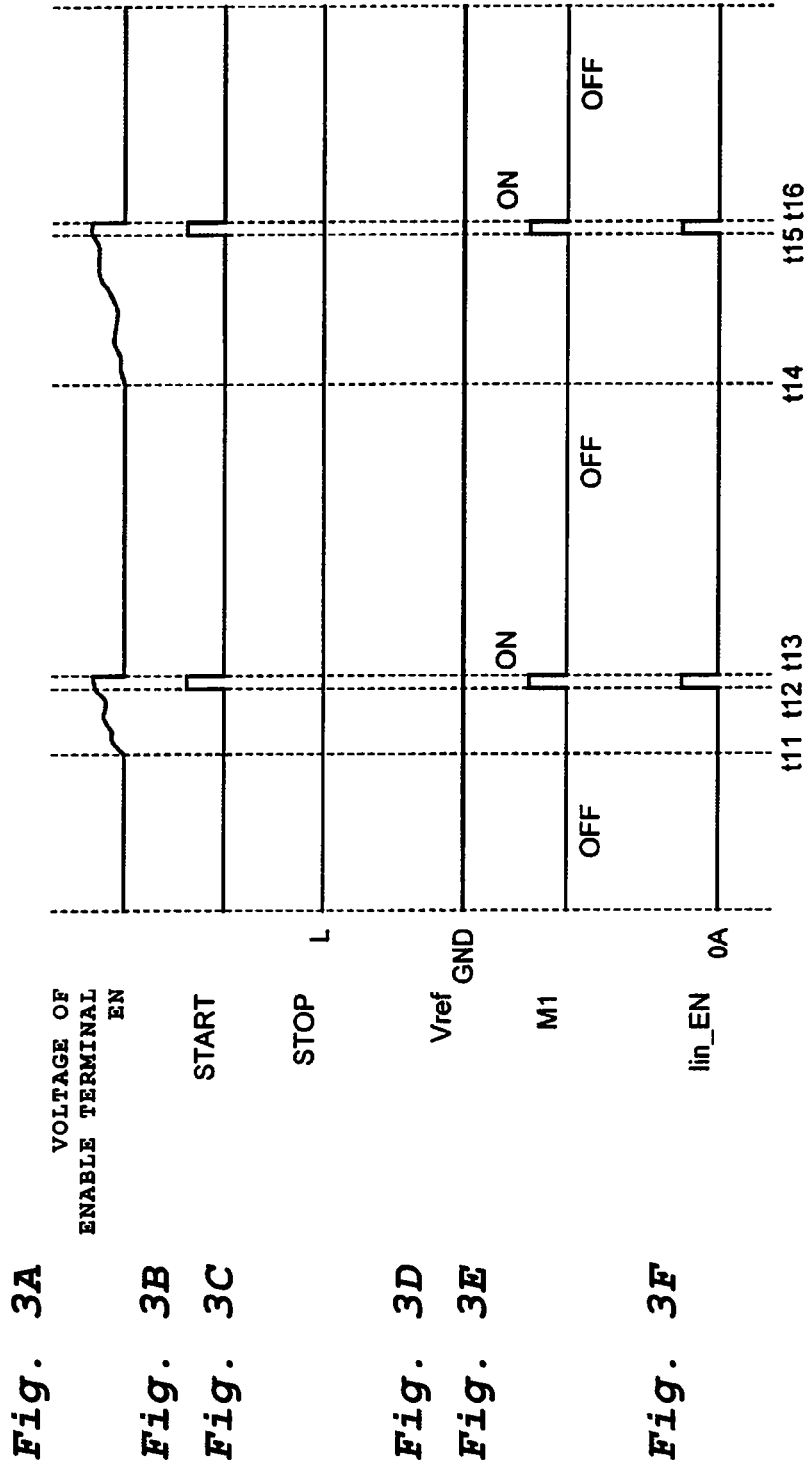
FIGS. 3A to 3F are time charts illustrating the operation when the enable terminal of the DC-DC converter according to the embodiment is open.

FIGS. 3A to 3F are time charts illustrating the operation when the enable terminal EN of the DC-DC converter related to an embodiment is open. After time point t11, the voltage at the open-state enable terminal EN gradually rises under the influence of high frequency noise, etc. that jumps to the enable terminal EN (FIG. 3A).

At time point t12, the Schmidt trigger circuit 11 generates the internal enable signal Enablex as the voltage at the enable terminal EN exceeds the first threshold. As a result, the starter circuit 13 generates the start signal START (FIG. 3B). Consequently, the N-type MOS transistor M1 is turned on (FIG. 3E) and the current Iin_EN flows from the enable terminal EN to the resistor R1 and the N-type MOS transistor M1 (FIG. 3F).

As a result, at time point t13, the positive charge accumulated at the enable terminal EN is discharged through the resistor R1 and the N-type MOS transistor M1, and the voltage at the enable terminal EN falls. Consequently, as the voltage at the enable terminal EN becomes lower than or equal to the second threshold, the Schmidt trigger circuit 11 turns off the internal enable signal Enablex. As a result, the starter circuit 13 terminates the start signal START (FIG. 3B). Consequently, the N-type MOS transistor M1 is turned off (FIG. 3E).

In addition, although the reference voltage generator 12 is started when the internal enable signal Enablex is generated at time point t12, because the internal enable signal Enablex is turned off at time point t13 before the rise in the reference voltage Vref, the operation of the reference voltage generator is turned off. Consequently, the reference voltage Vref is kept at the ground potential GND (FIG. 3D) and the reference voltage generator 12 does not generate the stop signal STOP (FIG. 3C).

Then, at time point t4, as the voltage at the enable terminal EN rises again, the same operation as above is executed until time point t16.

In this way, at the time when the enable terminal EN is open, the voltage at the enable terminal EN rises and the internal enable signal Enablex is generated, so that the N-type MOS transistor M1 is turned on. Consequently, the period during which the voltage at the enable terminal EN decreases and the internal enable signal Enablex is generated becomes shorter. As a result, the reference voltage Vref does not rise and there is no mis-operation of the DC-DC converter. That is, the output voltage Vout does not rise, so that the load is not damaged.

As explained above, according to the present embodiment, it is possible to suppress mis-operation and an increase in the area and, at the same time, it is possible to reduce the current Iin_EN flowing in from the enable terminal EN.

COMPARATIVE EXAMPLES

Figure 4:
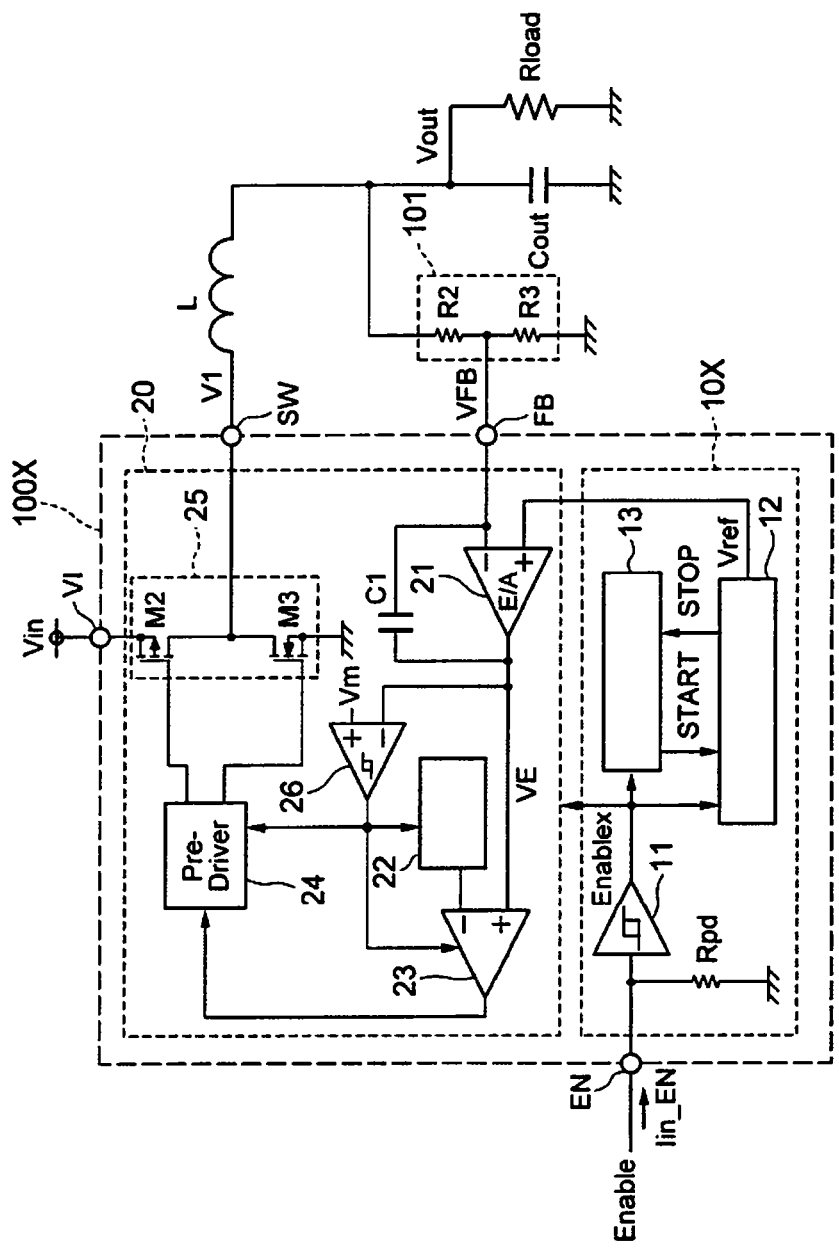
FIG. 4 is a block diagram illustrating a DC-DC converter presented for comparison with the DC-DC converter of FIG. 1.

In the following, a DC-DC converter in a comparative example known by the inventors will be explained. FIG. 4 is a block diagram illustrating the DC-DC converter related to the comparative example. In FIG. 4, the same reference numerals are given to the same parts as those in the above in FIG. 1, and only the different features will be explained below.

For the DC-DC converter of the present invention, instead of the N-type MOS transistor M1 and the resistor R1, an operation controller 10X has a pull-down resistor Rpd. This is a feature different from the embodiment. When the enable terminal EN is open, the voltage at the enable terminal EN becomes equal to the ground voltage by the pull-down resistor Rpd, so that the DC-DC converter controller 100 does not operate in this case.

FIGS. 5A to 5E are time charts illustrating the operation in the case of normal connection of the DC-DC converter related to the comparative example. During the period from time point t1 to t4 when the enable signal Enable is fed, the current Iin_EN keeps flowing from the enable terminal EN to the pull-down resistor Rpd (FIGS. 5A, 5E). Consequently, in the case of a low load, although the mean current consumption of the DC-DC converter excluding the current Iin_EN is, e.g., about 25 µA, as the current Iin_EN keeps flowing, the mean current consumption rises. As a result, different from the embodiment, in the comparative example, the efficiency of the DC-DC converter decreases under a low load. Also, in order to reduce the current Iin_EN, it is necessary to have a large value of the resistance of the pull-down resistor Rpd, and this leads to an increase in the size of the integrated circuit.

MODIFIED EXAMPLES

In the above explanation of the embodiment, an example in which the operation controller 10 is applied to the DC-DC converter 100 has been explained. However, the present invention is not limited to this scheme. For example, when the operation controller 10 of this embodiment is applied to a circuit having a low current consumption in which the current Iin_EN flowing in from the enable terminal EN cannot be ignored, it is possible to efficiently reduce the current consumption in addition to the effect of preventing mis-operation.

In addition, the logic state of the enable signal Enable, etc., may be inverted. That is, one may also adopt a scheme in which the enable signal Enable is on the high level when the enable signal Enable is not fed, and the enable signal Enable is on the low level when the enable signal Enable is fed. In this case, instead of the N-type MOS transistor M1, a P-type MOS transistor is used. This P-type MOS transistor is connected to the enable terminal EN at the drain via the resistor R1, and the input voltage Vin is fed to the source, while the start signal START is fed to the gate. The basic operation principle is the same as mentioned previously.

In addition, instead of the N-type MOS transistor M1, one may also use a bipolar transistor or other element as the switch element.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An operation controller comprising:
   a reference voltage generator, which is connected to an enable terminal to which an enable signal is to be supplied, and configured to increase a reference voltage in response to a start signal after supplying of the enable signal until the reference voltage is increased to a stable value, and to generate a stop signal after the reference voltage has risen to the stable value;
   a starter circuit configured to generate the start signal supplied to the reference voltage generator when the enable signal is supplied to the enable terminal, and terminate the start signal when the enable signal is no longer supplied or the stop signal is generated; and
   a switch element, which has a first end connected to the enable terminal and a second end configured for connection to a prescribed voltage, and which is configured to be turned on when the start signal is generated and turned off when the start signal is terminated.

2. The operation controller according to claim 1, wherein the enable signal to be supplied to the enable terminal has a high voltage, and the prescribed voltage is ground voltage.

3. The operation controller according to claim 2, wherein the switch element comprises an N-type MOS transistor having a drain connected to the enable terminal, a source configured for connection to the ground voltage, and a gate to which the start signal is to be supplied.

4. The operation controller according to claim 3, further comprising:
   a resistor connected between the enable terminal and the drain of the N-type MOS transistor, wherein
   a resistance value of the resistor is selected so that the enable signal is not supplied during the period in which the N-type MOS transistor is on.

5. A DC-DC converter controller comprising:
   an operation controller comprising
      a reference voltage generator, which is connected to an enable terminal to which an enable signal is to be supplied, and configured to increase a reference voltage in response to a start signal after supplying of the enable signal until the reference voltage is increased to a stable value, and to generate a stop signal after the reference voltage has risen to the stable value;
      a starter circuit configured to generate the start signal supplied to the reference voltage generator when the enable signal is supplied to the enable terminal, and terminate the start signal when the enable signal is no longer supplied or the stop signal is generated; and
      a switch element, which has a first end connected to the enable terminal and a second end configured for connection to a prescribed voltage, and which is configured to be turned on when the start signal is generated and turned off when the start signal is terminated; and
   a pulse controller configured to operate when the enable signal is supplied, output a pulse signal, and control the pulse signal so that a feedback voltage that is based on the output voltage approaches the reference voltage.

6. The DC-DC converter controller according to claim 5, wherein
   the pulse controller comprises:
   an error amplifier comprising an inverted input terminal, a non-inverted input terminal to which the reference voltage is supplied, and an output terminal, the error amplifier configured to amplify the difference between the feedback voltage and the reference voltage and to output an error signal that is based on the amplified difference through the output terminal;
   a capacitor connected between the inverted input terminal and the output terminal,
   a triangular wave oscillator configured to generate a triangular wave signal;
   a pulse width modulation (PWM) comparator configured to perform a comparison of the error signal and the triangular wave signal and output a PWM signal indicative of a result of the comparison;
   a pre-driver configured to output a driving signal corresponding to the PWM signal; and
   a switching part configured to switch based on the driving signal to allow the pulse signal to be output.

7. The DC-DC converter controller according to claim 6, wherein
   the pulse controller further comprises:
   a mode switching comparator configured to turn off at least some of the triangular wave oscillator, the PWM comparator, and the pre-driver, when a voltage level of the error signal changes from higher than or equal to a first voltage threshold to lower than the first voltage threshold, and to turn on the triangular wave oscillator, the PWM comparator, and the pre-driver, when the voltage level of the error signal changes from lower than a second voltage threshold to higher than or equal to the second voltage threshold.

8. The DC-DC converter controller according to claim 7, wherein the second voltage threshold is higher than the first voltage threshold.

9. The DC-DC converter controller according to claim 5, wherein the enable signal to be supplied to the enable terminal is a positive voltage and the prescribed voltage is a ground voltage.

10. The DC-DC converter controller according to claim 9, wherein the switch element comprises an N-type MOS transistor having a drain connected to the enable terminal, a source configured for connection to the ground voltage, and a gate to which the start signal is to be supplied.

11. The DC-DC converter controller according to claim 10, further comprising a resistor connected between the enable terminal and the drain of the N-type MOS transistor, wherein a resistance value of the resistor is selected so that the enable signal is not supplied during the period in which the N-type MOS transistor is on.

12. The DC-DC converter controller according to claim 5, wherein the pulse signal is subsequently smoothed to the output voltage by an external smoothing circuit.

13. A DC-DC converter comprising:
   an operation controller comprising
      a reference voltage generator, which is connected to an enable terminal to which an enable signal is to be supplied, and configured to increase a reference voltage in response to a start signal after supplying of the enable signal until the reference voltage is increased to a stable value, and to generate a stop signal after the reference voltage has risen to the stable value;
      a starter circuit configured to generate the start signal supplied to the reference voltage generator when the enable signal is supplied to the enable terminal, and terminate the start signal when the enable signal is no longer supplied or the stop signal is generated; and
      a switch element, which has a first end connected to the enable terminal and a second end configured for connection to a prescribed voltage, and which is configured to be turned on when the start signal is generated and turned off when the start signal is terminated;

a pulse controller configured to output a pulse signal; and a smoothing circuit comprising an inductor having a first end to which the pulse signal is supplied and a second end from which the output voltage is output, and an output capacitor having a first end connected to the second end of the inductor and a second end configured for connection with a ground voltage.

14. The DC-DC converter according to claim 13, wherein the pulse controller operates when the enable signal is supplied, and controls the pulse signal so that a feedback voltage that is based on the output voltage approaches the reference voltage.

15. The DC-DC converter according to claim 14, wherein the pulse controller comprises:

an error amplifier comprising an inverted input terminal, a non-inverted input terminal to which the reference voltage is supplied, and an output terminal, the error amplifying configured to amplify the difference between the feedback voltage and the reference voltage and output an error signal that is based on the amplified difference through the output terminal;

a capacitor connected between the inverted input terminal and the output terminal, a triangular wave oscillator configured to generate a triangular wave signal;

a pulse width modulation (PWM) comparator configured to perform a comparison of the error signal and the triangular wave signal and output a PWM signal indicative of a result of the comparison;

a pre-driver configured to output a driving signal corresponding to the PWM signal; and a switching part configured to switch based on the driving signal to allow the pulse signal to be output.

16. The DC-DC converter according to claim 15, wherein the pulse controller further comprises:

a mode switching comparator configured to turn off at least some of the triangular wave oscillator, the PWM comparator, and the pre-driver, when a voltage level of the error signal changes from higher than or equal to a first voltage threshold to lower than the first voltage threshold, and to turn on the triangular wave oscillator, the PWM comparator, and the pre-driver, when the voltage level of the error signal changes from lower than a second voltage threshold to higher than or equal to the second voltage threshold.

17. The DC-DC converter according to claim 16, wherein the second voltage threshold is higher than the first voltage threshold.

18. The DC-DC converter according to claim 13, wherein the enable signal to be supplied to the enable terminal is a positive voltage and the prescribed voltage is a ground voltage.

19. The DC-DC converter according to claim 18, wherein the switch element comprises an N-type MOS transistor having a drain connected to the enable terminal, a source configured for connection to the ground voltage, and a gate to which the start signal is to be supplied.

20. The DC-DC converter according to claim 19, further comprising a resistor connected between the enable terminal and the drain of the N-type MOS transistor, wherein a resistance value of the resistor is selected so that the enable signal is not supplied during the period in which the N-type MOS transistor is on.

* * * * *